United States Patent
Focke et al.

(10) Patent No.: US 8,390,506 B2
(45) Date of Patent: Mar. 5, 2013

(54) MOTOR VEHICLE FMCW RADAR HAVING LINEAR FREQUENCY RAMPS OF DIFFERENT SLOPES THAT ARE SET APART, WHICH ARE ASSOCIATED WITH DIFFERENT ANGULAR RANGES

(75) Inventors: Thomas Focke, Ahrbergen (DE); Joerg Hilsebecher, Hildesheim (DE); Arne Zender, Bad Salzdetfurth (DE); Thomas Schoeberl, Hildesheim (DE); Thomas Hansen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 12/733,605

(22) PCT Filed: Jul. 21, 2008

(86) PCT No.: PCT/EP2008/059542
§ 371 (c)(1),
(2), (4) Date: Jun. 23, 2010

(87) PCT Pub. No.: WO2009/033863
PCT Pub. Date: Mar. 19, 2009

(65) Prior Publication Data
US 2010/0277361 A1    Nov. 4, 2010

(30) Foreign Application Priority Data
Sep. 12, 2007 (DE) .................. 10 2007 043 535

(51) Int. Cl.
*G01S 13/00* (2006.01)
*G01S 13/08* (2006.01)
(52) U.S. Cl. .......... 342/70; 342/112; 342/128; 342/129; 342/133; 342/200
(58) Field of Classification Search .............. 342/70–72, 342/109, 112, 128, 129, 133, 200
See application file for complete search history.

(56) References Cited

U.S. PATENT DOCUMENTS

| | | | | |
|---|---|---|---|---|
| 4,509,049 A | * | 4/1985 | Haendel et al. ................. | 342/87 |
| 4,881,079 A | * | 11/1989 | Peregrim ....................... | 342/194 |
| 5,268,692 A | * | 12/1993 | Grosch et al. .................. | 342/70 |
| 5,345,470 A | * | 9/1994 | Alexander ..................... | 375/144 |
| 5,349,358 A | * | 9/1994 | Canal ............................ | 342/128 |
| 5,483,242 A | * | 1/1996 | Grein et al. ................... | 342/111 |
| 5,748,141 A | * | 5/1998 | Hoess ........................... | 342/109 |
| 5,768,131 A | * | 6/1998 | Lissel et al. ................... | 701/301 |
| 5,963,163 A | * | 10/1999 | Kemkemian et al. .......... | 342/109 |

(Continued)

FOREIGN PATENT DOCUMENTS

| | | |
|---|---|---|
| DE | 2 054 985 | 5/1972 |
| DE | 195 29 173 | 1/1997 |

(Continued)

*Primary Examiner* — Jack W Keith
*Assistant Examiner* — Peter Bythrow
(74) *Attorney, Agent, or Firm* — Kenyon & Kenyon LLP

(57) ABSTRACT

An FMCW radar locating device includes a transmitting device having a controllable transmitting-signal-generating device generating a transmitting signal having a frequency corresponding to an input control signal; a control device connected to the transmitting-signal-generating device and generating the input control signal which controls the transmitting signal such that it rises periodically in a discontinuous, inconsistent linear fashion in first frequency segments, and drops periodically in a discontinuous, inconsistent linear fashion in second frequency segments; and a receiving device for receiving an echo signal reflected by an object and locating an object based on the received echo signal.

18 Claims, 3 Drawing Sheets

U.S. PATENT DOCUMENTS

| | | | |
|---|---|---|---|
| 6,396,436 B1 * | 5/2002 | Lissel et al. | 342/70 |
| 6,492,938 B1 * | 12/2002 | Alland | 342/129 |
| 6,646,587 B2 * | 11/2003 | Funai | 342/26 R |
| 6,646,589 B2 * | 11/2003 | Natsume | 342/70 |
| 7,002,512 B2 * | 2/2006 | Isaji | 342/159 |
| 2002/0044082 A1 * | 4/2002 | Woodington et al. | 342/70 |
| 2003/0052813 A1 * | 3/2003 | Natsume | 342/70 |
| 2004/0140927 A1 * | 7/2004 | Meinecke et al. | 342/70 |
| 2005/0010130 A1 * | 1/2005 | Morris et al. | 600/562 |
| 2005/0046597 A1 * | 3/2005 | Hutchison et al. | 340/917 |
| 2005/0225481 A1 * | 10/2005 | Bonthron | 342/175 |
| 2007/0152871 A1 * | 7/2007 | Puglia | 342/70 |
| 2008/0100500 A1 * | 5/2008 | Kondoh | 342/109 |
| 2008/0150790 A1 * | 6/2008 | Voigtlaender et al. | 342/127 |
| 2008/0186223 A1 * | 8/2008 | Mayer et al. | 342/109 |
| 2011/0122014 A1 * | 5/2011 | Szajnowski | 342/109 |

FOREIGN PATENT DOCUMENTS

| | | |
|---|---|---|
| DE | 103 55 796 | 6/2005 |
| DE | 10 2004 034 429 | 2/2006 |
| DE | 10 2004 052 518 | 5/2006 |
| GB | 1 322 848 | 11/1971 |
| GB | 2 165 414 | 4/1986 |
| JP | 2004-151022 | 5/2004 |
| JP | 2005-10130 | 1/2005 |
| WO | WO 03/048801 | 6/2003 |
| WO | WO 2007/014333 | 2/2007 |
| WO | WO 2008/006653 | 1/2008 |

* cited by examiner

MOTOR VEHICLE FMCW RADAR HAVING LINEAR FREQUENCY RAMPS OF DIFFERENT SLOPES THAT ARE SET APART, WHICH ARE ASSOCIATED WITH DIFFERENT ANGULAR RANGES

BACKGROUND OF THE INVENTION

1. Field of the Invention

The present invention relates to an FMCW radar locating device and a corresponding FMCW radar locating method.

2. Description of Related Art

Analyses have shown that a substantial number of traffic accidents are able to be avoided by the timely detection of dangers and by appropriately suitable driving maneuvers. The avoidance may be achieved by giving suitable warning signs to the driver or by automatic longitudinal and/or lateral control of the vehicle. One prerequisite for the awareness of the dangerous situation is suitable sensor devices.

Radar systems in the millimeter wave range have been used for some time now, as driver assistance systems for the awareness of danger. A distinction is made, in this context, between pulsed radar systems and continuous wave radar systems (CW). 77-GHZ-FMCW radar systems, for example, make possible the recording of objects within a range of a few centimeters to more than 250 meters. The distance of the objects and the relative speed of the objects with respect to one's own vehicle are ascertained simultaneously, as well as, in the case of an appropriate number of antennas, their angle to one's own vehicle's longitudinal axis, in this context.

In the usual FMCW radar systems, a signal is emitted which constantly changes in frequency. In order to limit the frequency range and to simplify the evaluation, several linearly rising or falling ramps are typically used.

FIG. 4 shows a representation of the time dependence (time t) of the transmitting frequency of a known FMCW radar locating device.

In FIG. 4, reference symbol FS denotes a transmitting signal and FE a corresponding echo signal. The quantity of the rate of change (slope steepness) of transmitting signal FS is constant in such known radar systems. If an echo signal FE is received, this has a transit time displacement, and thus has a frequency deviating from that of the transmitting signal. The distance from the measuring object, for instance, is able to be ascertained with the aid of frequency difference df.

Published German patent document DE 10 2004 034 429 A1 describes a radar locating system having a plurality of transmitting elements, at least two receiving elements and a device for the digital control of the processing of the receiving signals of the receiving elements, which operates according to the FMCW principle.

BRIEF SUMMARY OF THE INVENTION

The FMCW radar locating device according to the present invention and the corresponding FMCW radar locating method have the advantage over the usual design approaches that, in predetermined less important ranges, they have a coarse resolution, and in predetermined important ranges, they have a fine resolution.

Since one is able to provide a frequency-angle connection in FMCW locating systems, one is able to set the resolution in the appropriate angle range over the different slopes of the ramps. Consequently, one preferably achieves a coarse resolution in the edge regions and a fine resolution in the direction of motion, that is, a rough assessment of a guardrail, for example, and a fine assessment, for example, of a preceding vehicle.

The idea on which the present invention is based is, in the case of an FMCW locating device, not to travel ramps having a uniform slope, in absolute value, but to travel discontinuous ramps having piecewise different slopes. In other words, the ramp steepness (frequency change per time) is changed during one ramp as a function of the visual range. Uninteresting ranges are thereby able to be scanned more rapidly than interesting ranges.

According to one example refinement, the first frequency segments and/or the second frequency segments correspond to respectively different angular ranges of a total recording range.

According to another example refinement, the first frequency segments pass through the total recording range in a first direction, and the second frequency segments pass through the total recording range in a second direction, the second direction being opposite to the first direction.

According to an additional example refinement, the first frequency segments and/or the second frequency segments have different slopes corresponding to the different echo signal resolution.

According to yet another example refinement, frequency segments of lower echo signal resolution correspond to bigger slopes and bigger angular ranges at the same time, and frequency segments of greater echo signal resolution correspond to smaller slopes and smaller angular ranges at the same time.

In one further example refinement, the first frequency segments and/or the second frequency segments are specifiable in a fixed manner by the control device.

In still another example refinement, the first frequency segments and/or the second frequency segments are able to be flexibly designed by the control device as a function of at least one driving parameter.

DETAILED DESCRIPTION OF THE INVENTION

In the figures, identical reference symbols denote identical or functionally equivalent elements.

Figure 1:
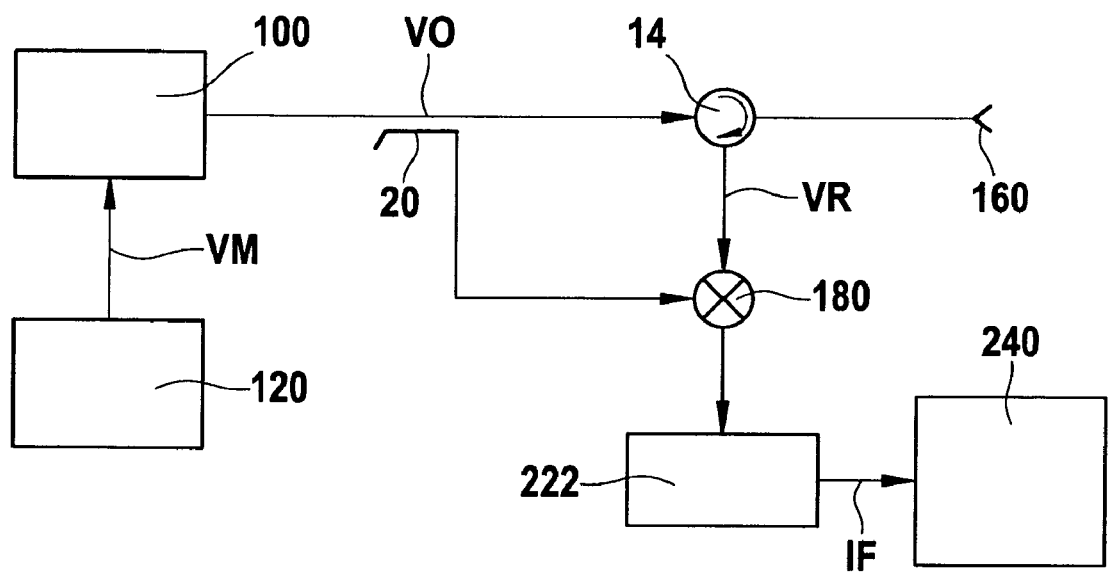
FIG. 1 shows a block diagram of an FMCW radar locating device according to a first example embodiment of the present invention.

FIG. 1 shows a block diagram of an FMCW radar locating device according to a first specific embodiment of the present invention.

A voltage-controlled oscillator 100 is controlled or modulated by an output signal VM of a control device 120, and the output signal VO of voltage-controlled oscillator 100 is output to a circulator 14. A first output signal of circulator 14 supplies output signal VO of voltage-controlled oscillator 100, essentially unattenuated, to an antenna 160, which radiates the frequency-modulated signal as transmitting signal. The radiated transmitting signal may be reflected back to antenna 160 by one or more objects that are to be recorded, and echo signal VR, thus reflected, returns from antenna 160 to circulator 14, which supplies reflected echo signal VR from its second output to an input of a mixer 180. A second input of mixer 180 is fed with output signal VO of voltage-controlled oscillator 100 via a coupler 20. The output signal of mixer 180 is supplied to a low-pass filter 222, in order to supply an intermediate frequency signal IF to a signal processing device 240. Signal processing device 240 carries out a Fourier transformation of intermediate frequency signal IF, because the range of any objects in the radar field of vision is present as frequency information in intermediate frequency signal IF.

Figure 2A:
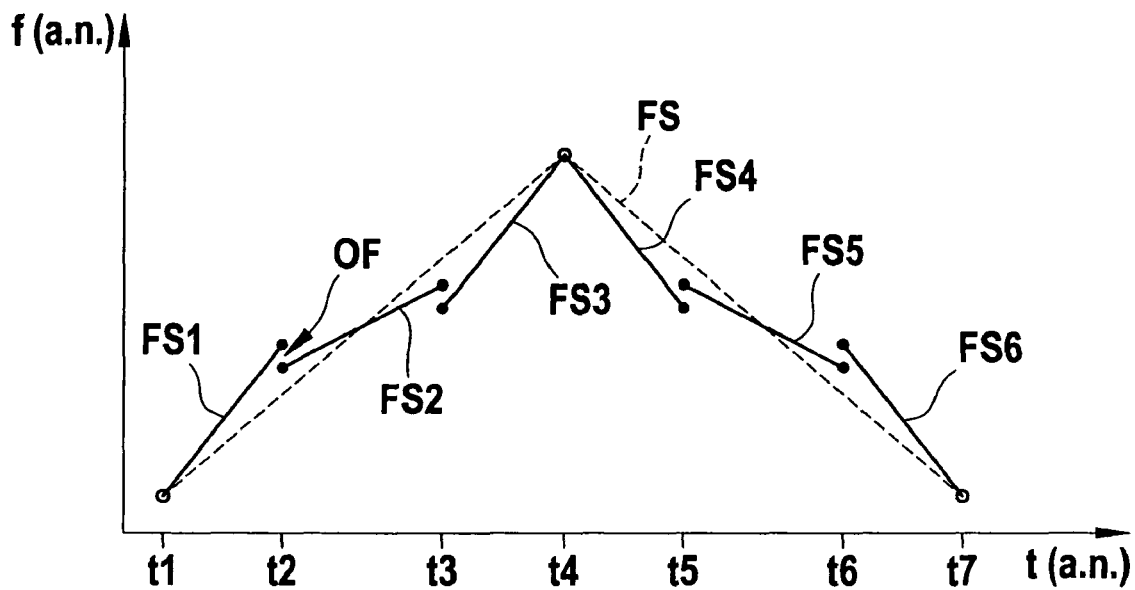
FIG. 2a shows a representation of the time dependence of the transmitting frequency of the FMCW radar locating device according to the first example embodiment of the present invention.
Figure 2B:
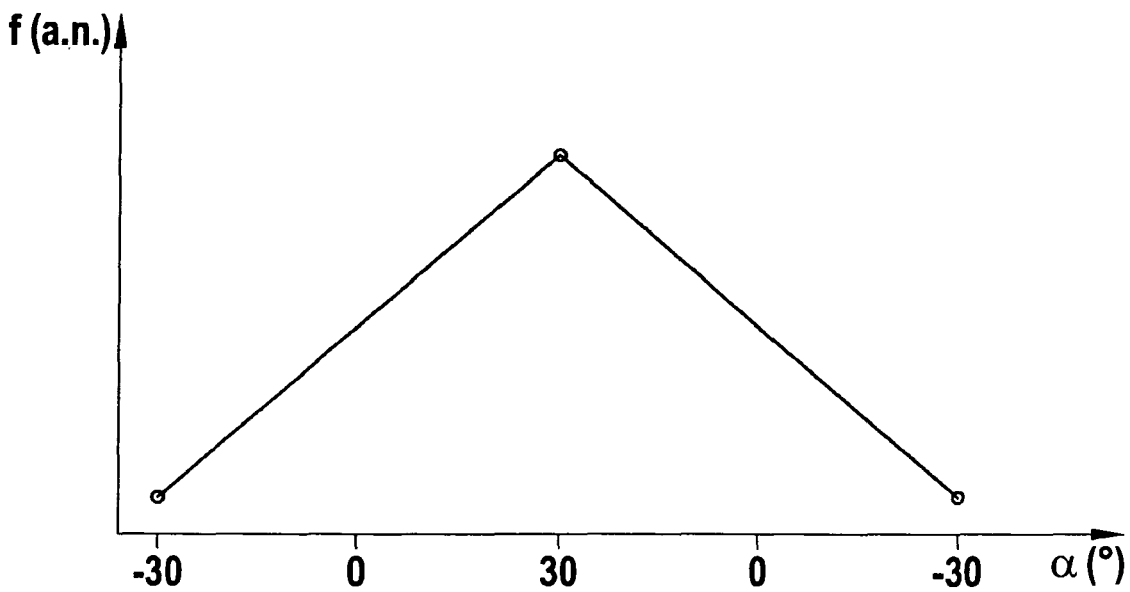
FIG. 2b shows a representation of the frequency-angle relationship of the transmitting frequency of the FMCW radar locating device according to the first example embodiment of the present invention.

FIG. 2a shows a representation of the time dependence of the transmitting frequency of the FMCW radar locating device according to the first example embodiment of the present invention, and FIG. 2b shows a corresponding representation of the frequency-angle relationship (angle α) of the transmitting frequency of the FMCW radar locating device according to the first specific embodiment of the present invention.

Figure 4:
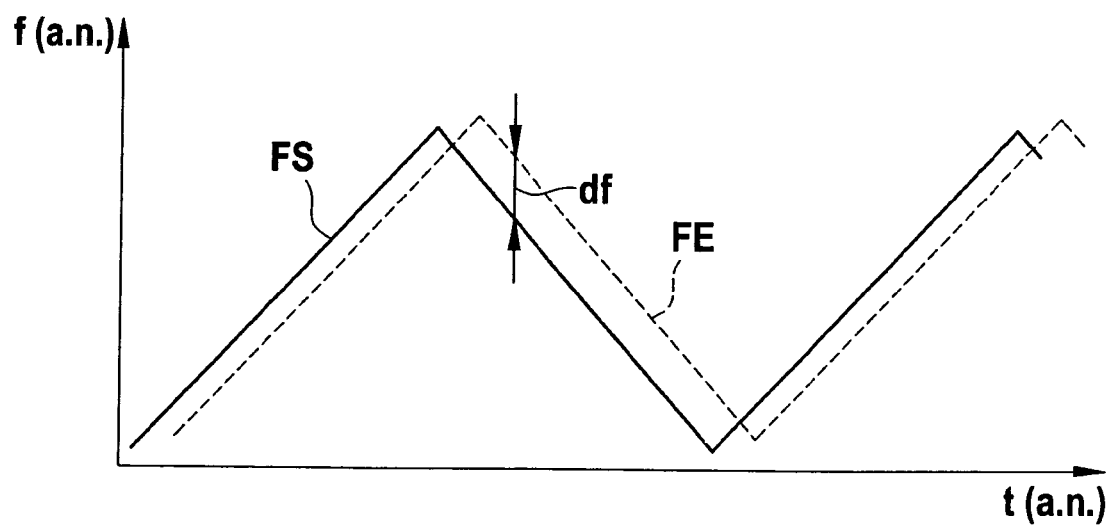
FIG. 4 shows a representation of the time dependence of the transmitting frequency of a known FMCW radar locating device.

FIG. 2a shows both the time dependence of the usual transmitting signal FS (dashed line, cf. FIG. 4) and of the transmitting signal according to the example embodiment, which is piecewise constant, and is composed of frequency segments FS1 (t1 to t2), FS2 (t2 to t3), FS3 (t3 to t4), FS4 (t4 to t5), FS5 (t5 to t6), FS6 (t6 to t7), which have different slopes.

As may be seen in FIG. 2a, the frequency between times t1 and t4 rises in three different frequency segments or ramps, and falls between times t4 and t7 in three different ramps. After that, rise and fall further repeat periodically.

The absolute value of the ramp steepness of frequency segments FS1, FS3, FS4, FS6 is the same and so is the absolute value of the ramp steepness of the frequency segments FS2, FS5, in this context. As may also be seen in FIG. 2, the absolute value of the ramp steepness of frequency segments FS1, FS3, FS4, FS6 is greater than the absolute value of the ramp steepness of the frequency segments FS2, FS5. This is because a higher ramp steepness brings with it a poorer resolution (shorter scanning) and a lower ramp steepness brings about a better resolution (longer scanning).

Such a lower ramp steepness or better resolution according to frequency segments FS2, FS5 is desired at the scanning angle range of ca. −12° to +12° , whereas at an angle range between −12° and −30° and +12° and +30° a lower, or rather coarser resolution is sufficient. What may also be seen in FIG. 2 is an abrupt offset OF at the transition locations of two respective frequency segments. This contributes to the simplification of the signal processing and to the better identification of the echos received, but it is not absolutely necessary.

Figure 3:
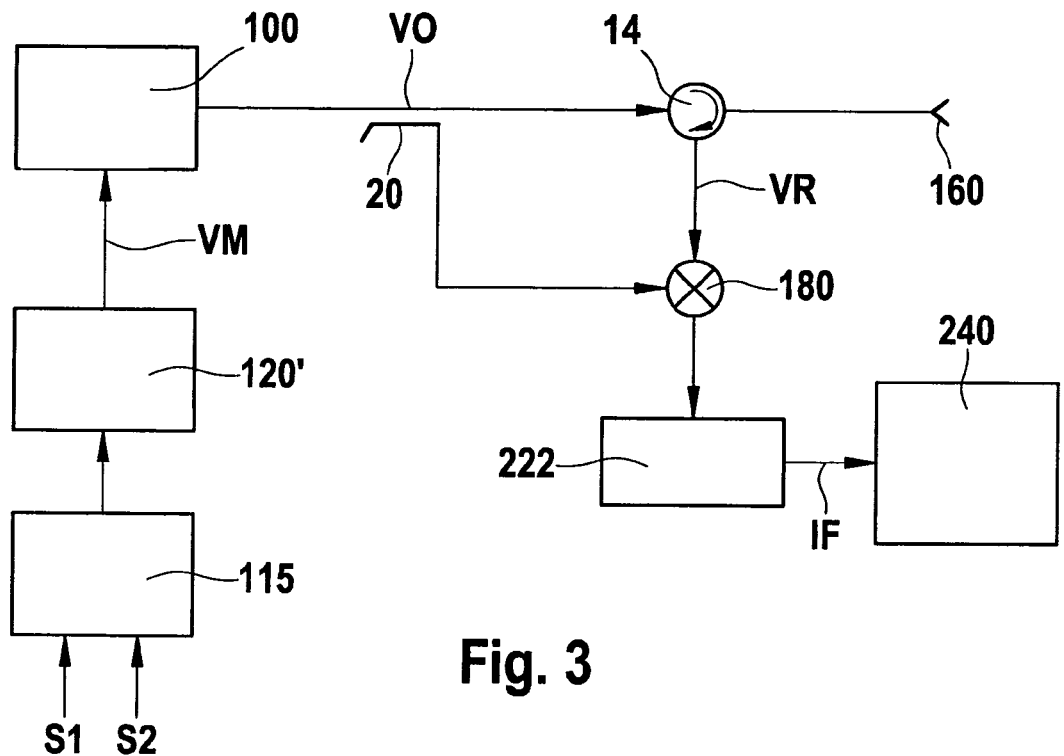
FIG. 3 shows a block diagram of an FMCW radar locating device according to a second example embodiment of the present invention.

FIG. 3 shows a block diagram of an FMCW radar locating device according to a second example embodiment of the present invention.

Whereas in the first example embodiment the ramp steepnesses of frequency segments FS1-FS6 are specified in a fixed manner by control device 120, in control device 120' of the second example embodiment, information for the required resolution is gathered, and with that, for the steepnesses of the frequency segments, from the signals of sensors S1, S2, and, based on this, is determined via a determination device 115, according to specified criteria. This information may be gathered from various sensor sources, such as navigation, experience, vehicle-vehicle communication, driving state (speed, acceleration), an additional environmental sensor system or the surroundings. In the example provided, S1 is supposed to represent a speed sensor and S2 an acceleration sensor.

In other words, frequency segments FS1-FS6 are specified in a fixed manner in the first example embodiment, and in the second example embodiment they are developed flexibly as a function of at least one driving parameter.

Although the present invention has been described above with reference to preferred exemplary embodiments, it is not limited thereto but rather is modifiable in many ways.

The steepness of the frequency segments may be developed completely differently as a function of the driving situation or of the driving surroundings or of the specific signal recording and signal evaluation. Thus, in the case of cornering, for example, it is meaningful to illuminate the curve in greater detail, that is, to resolve larger angles more finely.

In principle, a change in resolution may also be effected by a dynamic or discontinuous change in the scanning frequency ranges, for instance, a low scanning frequency from t1 to t2 and t3 to t4, and a higher scanning frequency from t2 to t3. The change in the scanning frequency may also be achieved by a decimation filter. The ramps may overlap with respect to the initial frequency and the ending frequency.

What is claimed is:

1. An FMCW radar locating device, comprising:
   a transmitting device having a controllable transmitting-signal-generating device configured to generate a transmitting signal having a frequency corresponding to an input control signal;
   a control device connected to the transmitting-signal-generating device and configured to generate the input control signal, wherein the input control signal controls the transmitting signal such that the transmitting signal (a) rises periodically in a discontinuous, piece-wise linear fashion in first frequency segments, and (b) drops periodically in a discontinuous, piece-wise linear fashion in second frequency segments; and
   a receiving device configured to receive an echo signal reflected by an object and locate an object based on the received echo signal;
   wherein at least one slope of a linear piece in the first frequency segment is different from a slope of another linear piece of the first frequency segment.

2. The FMCW radar locating device as recited in claim 1, wherein the first frequency segments and the second frequency segments correspond to respectively different angular ranges of an overall recording range.

3. The FMCW radar locating device as recited in claim 2, wherein the first frequency segments pass through the overall recording range in a first direction, and the second frequency segments pass through the overall recording range in a second direction opposite to the first direction.

4. The FMCW radar locating device as recited in claim 1, wherein the first frequency segments and the second frequency segments have different slopes corresponding to different echo signal resolutions.

5. The FMCW radar locating device as recited in claim 4, wherein frequency segments of lower echo signal resolution correspond to larger slopes and larger angular ranges at the same time, and wherein frequency segments of higher echo signal resolution correspond to smaller slopes and smaller angular ranges at the same time.

6. The FMCW radar locating device as recited in claim 1, wherein the first frequency segments and the second frequency segments are specified in a fixed manner by the control device.

7. The FMCW radar locating device as recited in claim 1, wherein the first frequency segments and the second frequency segments are determined by the control device as a function of at least one driving parameter measured by sensors on a vehicle.

8. An FMCW radar locating method, comprising:
generating an input control signal by a control device;
emitting a transmitting signal by a controllable transmitting-signal-generating device, wherein the transmitting signal has a frequency corresponding to the input control signal, and wherein the input control signal controls the transmitting signal such that the transmitting signal (a) rises periodically in a discontinuous, piece-wise linear fashion in first frequency segments, and (b) drops periodically in a discontinuous, piece-wise linear fashion in second frequency segments;
receiving an echo signal reflected by an object; and
locating the object based on the received echo signal;
wherein at least one slope of a linear piece in the first frequency segment is different from a slope of another linear piece of the first frequency segment.

9. The FMCW radar locating method as recited in claim 8, wherein the first frequency segments and the second frequency segments correspond to respectively different angular ranges of an overall recording range.

10. The FMCW radar locating method as recited in claim 9, wherein the first frequency segments pass through the overall recording range in a first direction, and the second frequency segments pass through the overall recording range in a second direction opposite to the first direction.

11. The FMCW radar locating method as recited in claim 8, wherein the first frequency segments and the second frequency segments have different slopes corresponding to different echo signal resolutions.

12. The FMCW radar locating method as recited in claim 11, wherein frequency segments of lower echo signal resolution correspond to larger slopes and larger angular ranges at the same time, and wherein frequency segments of higher echo signal resolution correspond to smaller slopes and smaller angular ranges at the same time.

13. The FMCW radar locating method as recited in claim 8, wherein the first frequency segments and the second frequency segments are specified in a fixed manner by the control device.

14. The FMCW radar locating method as recited in claim 8, wherein the first frequency segments and the second frequency segments are determined by the control device as a function of at least one parameter measured by sensors on a vehicle.

15. The FMCW radar locating device as recited in claim 1, wherein at least one slope of a linear piece in the second frequency segment is different from a slope of another linear piece of the second frequency segment.

16. The FMCW radar locating device as recited in claim 1, wherein slopes of the linear pieces in the first segments and the second segments are determined by the control device as a function of at least one parameter measured by sensors on a vehicle.

17. The FMCW radar locating method as recited in claim 8, wherein at least one slope of a linear piece in the second frequency segment is different from a slope of another linear piece of the second frequency segment.

18. The FMCW radar locating method as recited in claim 8, wherein slopes of the linear pieces in the first segments and the second segments are determined by the control device as a function of at least one parameter measured by sensors on a vehicle.

* * * * *

UNITED STATES PATENT AND TRADEMARK OFFICE
CERTIFICATE OF CORRECTION

PATENT NO. : 8,390,506 B2  Page 1 of 1
APPLICATION NO. : 12/733605
DATED : March 5, 2013
INVENTOR(S) : Focke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this
First Day of September, 2015

Michelle K. Lee
*Director of the United States Patent and Trademark Office*